US008086730B2

(12) United States Patent
Drory et al.

(10) Patent No.: US 8,086,730 B2
(45) Date of Patent: Dec. 27, 2011

(54) METHOD AND SYSTEM FOR MONITORING A WORKSTATION

(75) Inventors: Tal Drory, Haifa (IL); Eugene Walach, Haifa (IL); Asaf Tzadok, Haifa (IL); Amnon Ribak, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/464,893

(22) Filed: May 13, 2009

(65) Prior Publication Data

US 2010/0293267 A1 Nov. 18, 2010

(51) Int. Cl.
 *G06F 15/173* (2006.01)
 *G08B 23/00* (2006.01)
(52) U.S. Cl. .......................... 709/224; 709/223; 726/22
(58) Field of Classification Search .................. 709/223, 709/224, 225; 726/22, 23
 See application file for complete search history.

(56) References Cited

U.S. PATENT DOCUMENTS

| | | | |
|---|---|---|---|
| 6,453,254 B1 * | 9/2002 | Bullwinkel et al. ............. 702/81 |
| 7,004,389 B1 * | 2/2006 | Robinson et al. ............. 235/382 |
| 2001/0054100 A1 * | 12/2001 | Roche et al. .................. 709/224 |
| 2002/0129139 A1 * | 9/2002 | Ramesh ........................ 709/224 |
| 2003/0037116 A1 * | 2/2003 | Nolan et al. .................. 709/206 |
| 2005/0080898 A1 * | 4/2005 | Block ............................ 709/225 |
| 2005/0183143 A1 * | 8/2005 | Anderholm et al. ............ 726/22 |
| 2005/0281276 A1 | 12/2005 | West et al. |
| 2006/0224710 A1 * | 10/2006 | Price .............................. 709/223 |
| 2006/0281469 A1 * | 12/2006 | Stoller et al. ............... 455/456.1 |
| 2007/0094725 A1 * | 4/2007 | Borders ........................... 726/22 |
| 2007/0158410 A1 * | 7/2007 | Bustamante ................... 235/380 |
| 2007/0207773 A1 * | 9/2007 | Braunstein ................. 455/404.2 |
| 2008/0244061 A1 * | 10/2008 | Kime ............................. 709/224 |
| 2010/0125911 A1 * | 5/2010 | Bhaskaran ....................... 726/23 |
| 2010/0293267 A1 * | 11/2010 | Ribak et al. ................... 709/224 |

OTHER PUBLICATIONS

Aung Htike Phyo, Steven Furnell and Emmanuel Ifeachor, "A Framework for Monitoring Insider Misuse of IT Applications", 2004, In Proc. of the ISSA 2004 Enabling Tomorrow Conference.*
Aung Htike Phyo, Steven M. Furnell and Francisco Portilla, "A Framework for Role-Based Monitoring of Insider Misuse", 2004, IFIP International Federation for Information Processing, vol. 148/2004, pp. 51-65.*
Cyclope Employee Surveillance Solution—Features Source: http://www.amplusnet.com/products/cyclope/features.htm.
Employee Monitoring Software Source: http://www.computer-monitoring.com/employee_monitoring.htm.
Ghulam Ali et al., "Towards an automated multiagent system to monitor user activities against insider threat", IEEE, 2008. Source: http://ieeexplore.ieee.org/Xplore/login.jsp?url=/iel5/4542558/4547627/04547660.pdf?temp=x.

* cited by examiner

*Primary Examiner* — Aaron Strange

(57) ABSTRACT

A method and system for monitoring a workstation. The system includes a monitoring system for monitoring activity on a workstation and an analysis module for comparing a monitored activity to specified activities in a work profile. The system may include an alert generator for generating an alert if the monitored activity does not conform to the work profile. The work profile may be a user profile of specified activities allowed to be performed by a user, and/or a transaction profile of a sequence of specified activities to be performed in a transaction by a user. The monitoring system includes an inputs monitor for monitoring inputs by the user into the workstation, a screen monitor which extracts content from a screen display viewed by a user, and a physical presence monitor to determine if a user is at his workstation.

30 Claims, 4 Drawing Sheets

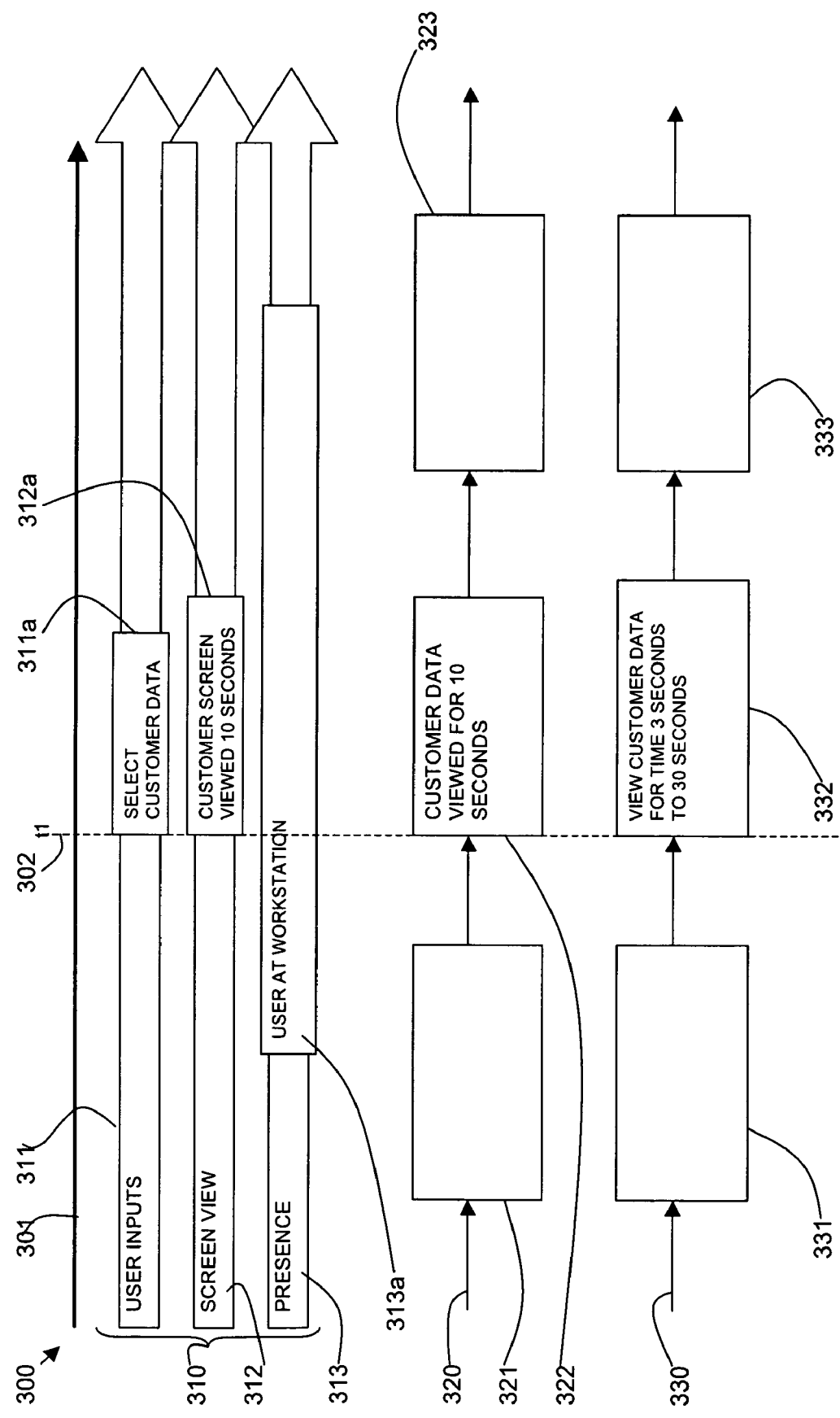

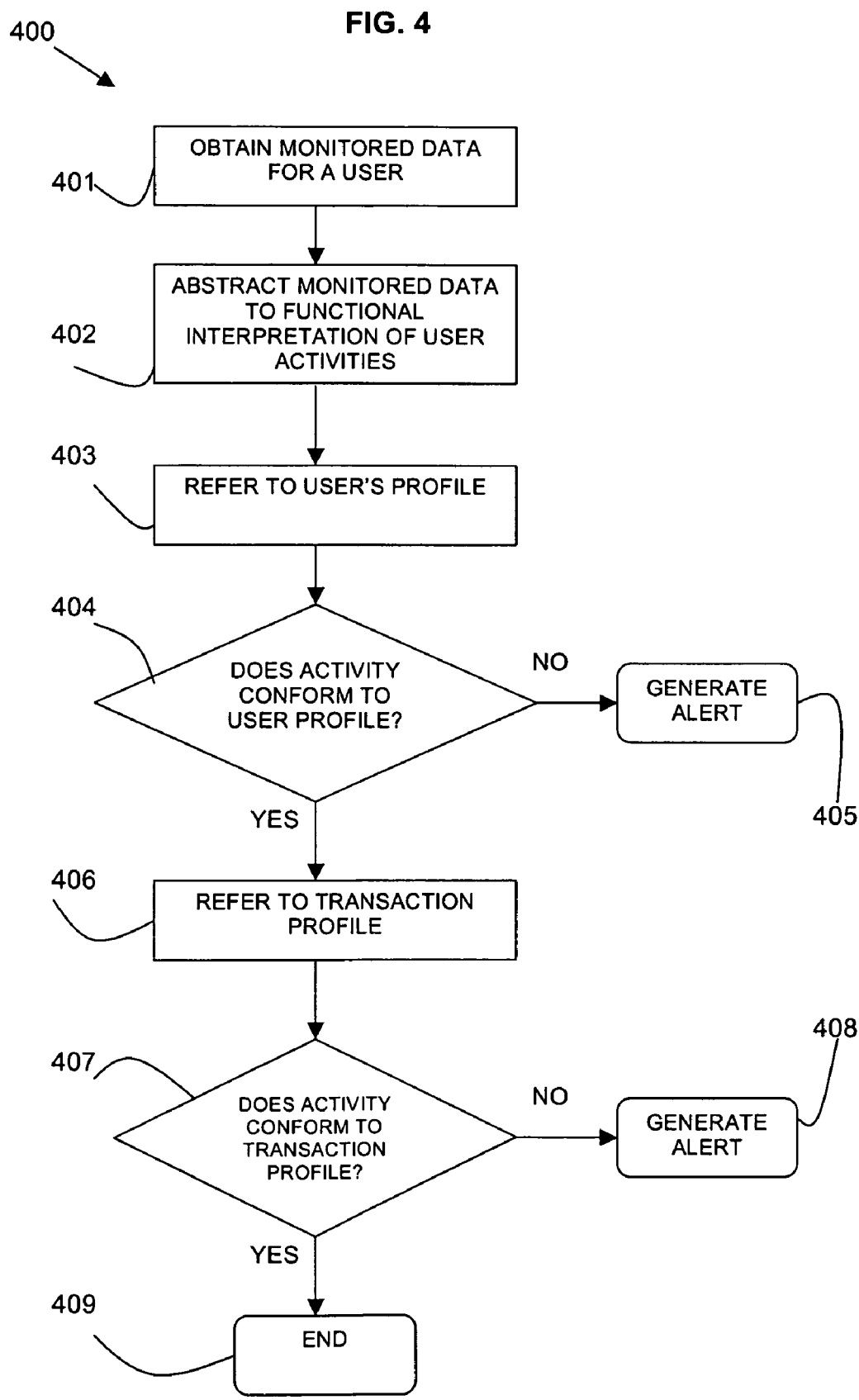

METHOD AND SYSTEM FOR MONITORING A WORKSTATION

FIELD OF THE INVENTION

This invention relates to the field of monitoring of workstations. In particular, the invention relates to monitoring of workstations for quality assurance, training and adherence to work profiles.

BACKGROUND OF THE INVENTION

Effective business process monitoring is one of the corner stones of the modern business practices. It is driven both by regulatory and legal needs and by a desire to improve quality by effective efficiency monitoring.

The software industry has developed many monitoring solutions. These solutions provide extensive logging capabilities allowing maintenance of user key-strokes history. In addition, screen-scraping capabilities are available allowing monitors to view the screens that have been presented to the given user.

Despite the fact that existing logging capabilities are quite extensive, their usefulness is limited due to the amount of data generated.

SUMMARY OF THE INVENTION

According to a first aspect of the present invention there is provided a system for monitoring a workstation, comprising: a processor; a monitoring system for monitoring activity on a computer workstation; an abstraction module that provides functional interpretation of the activity; and an analysis module for comparing the functional interpretation of the activity to specified activities in a work profile; wherein any of said monitoring system, abstraction module, and analysis module are implemented in either computer hardware or computer software and embodied in a computer readable medium.

The system may include an alert generator for generating an alert if the monitored activity does not conform to the work profile.

A work profile may be a user profile of specified activities allowed to be performed by a user, or a transaction profile of a sequence of specified activities to be performed in a transaction by a user.

The monitoring system may include an inputs monitor for monitoring inputs by a user into the workstation by an input device, which monitors one or more of the group of: keystrokes, pointer device movement and input, touch screen input, joystick input.

The monitoring system may also or alternatively include a screen monitor, which extracts content from a screen display viewed by a user. In one embodiment, this is done by using optical character recognition (OCR) based content extraction.

The monitoring system may also or alternatively include a physical presence monitor to determine if a user is at his workstation.

The system includes a log of monitored data for analysis.

In one embodiment, an active monitoring system is used including a test pattern generator, wherein the test pattern calls for a required response.

The system may be used as a training system for a user to monitor and analyse their own activities.

The system may include a privacy configuration means to restrict monitoring to work related activities.

According to a second aspect of the present invention there is provided a method for monitoring a workstation, comprising: monitoring activity on a computer workstation, including inputs by the user using input devices; converting the activity to a functional interpretation of the activity; and comparing the functional interpretation of the activity to specified activities in a work profile; wherein any of said steps are implemented in either of computer hardware or computer software and embodied in a computer-readable medium.

The method may include generating an alert if the monitored activity does not conform to the work profile.

The work profile may be a user profile of specified activities allowed to be performed by a user, or a transaction profile of a sequence of specified activities to be performed in a transaction by a user.

Monitoring activity may also include monitoring a screen display viewed by a user including extracting content from the screen display. In one embodiment, this is done using optical character recognition (OCR) based content extraction.

Monitoring activity may also or alternatively include monitoring the physical presence of a user at his workstation.

The method may include active monitoring including generating a test pattern, wherein the test pattern calls for a required response.

According to a third aspect of the present invention there is provided a computer program product for monitoring a workstation, the computer program product comprising: a computer readable storage medium; computer program instructions operative to: monitor activity on a computer workstation, including inputs by the user using input devices; convert the activity to a functional interpretation of the activity; and compare the functional interpretation of the activity to specified activities in a work profile.

According to a fourth aspect of the present invention there is provided a method of providing a service to a customer over a network, the service comprising: monitoring activity on a computer workstation, including inputs by the user using input devices; converting the activity to a functional interpretation of the activity; and comparing the functional interpretation of the activity to specified activities in a work profile; wherein any of said steps are implemented in either of computer hardware or computer software and embodied in a computer-readable medium.

The functional monitoring described is primarily focused on ensuring adherence to specified work profiles. This in turn can be utilized for the purposes of job quality assurance or on-the-job training.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 3 is a schematic representation of a method in accordance with the present invention; and FIG. 4 is a flow diagram of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described for monitoring a workstation to ensure adherence to work profiles. Existing monitoring is improved by introducing the notion of functional monitoring by combining monitoring of activity and presence with high-level functional analysis of the business process.

A user is a workstation operator who falls under the supervision of an organisation or other entity. A user may be an employee, a student, a subcontractor, or other form of user who must follow procedures.

The described system consists of two parts: the first one handles data acquisition, and the second one performs high-level analysis and, optional, alert generation.

Figure 1:
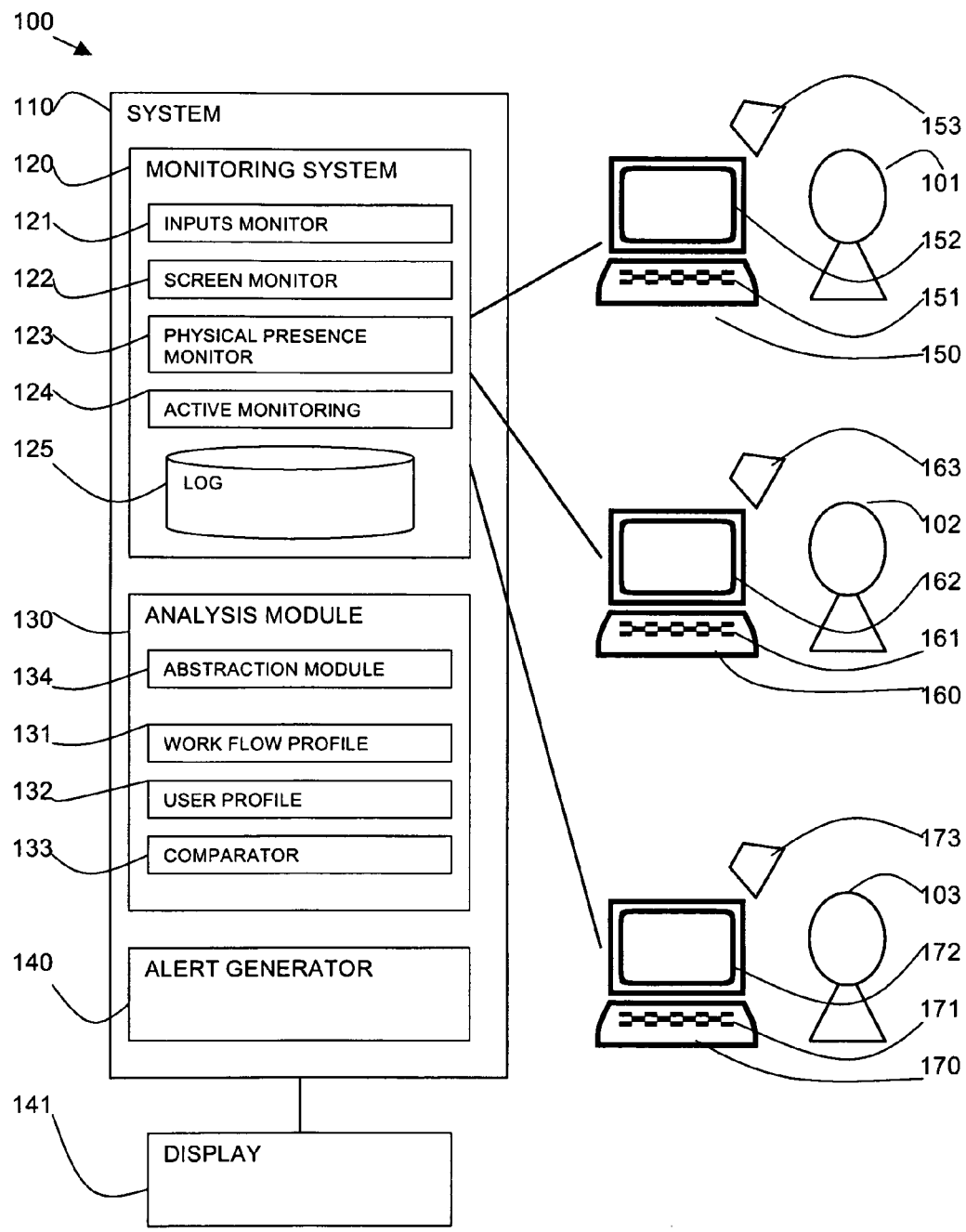
FIG. 1 is a block diagram of a system in accordance with the present invention.

Referring to FIG. 1, an environment 100 is shown with users 101-103 working at workstations 150, 160, 170. A workstation 150, 160, 170 includes input means 151, 161, 171 such as a keyboard, pointer device, touch screen, etc., a screen or monitor 152, 162, 172, and a user presence capturing mechanism 153, 163, 173 such as a camera, seat pressure pad, etc.

A system 110 provides a monitoring or data acquisition system 120, an analysis module 130, and an optional alert generator 140. The system 110 may also include a display 141 for displaying results of the monitoring and analysis, including any alerts, to an administrator.

The monitoring system 120 includes an input monitor 121 for monitoring user inputs such as keystrokes, pointer means movement and clicks, touch screen inputs, etc. made to the input means 151, 161, 171 by users 101-103.

The monitoring system 120 also includes a screen monitor 122 for monitoring the display on the user's screen 152, 162, 172. For example, the screen monitor may use screen-scraping techniques including OCR (optical character recognition) based screen understanding providing functional history of information viewed by the user 101-103.

The monitoring system 120 also includes a physical presence monitor 123 for monitoring whether the user 101-103 is at the workstation 150, 160, 170. The physical presence monitor 123 uses the presence capturing mechanism 153, 163, 173.

A log 125 maintains a history of the monitored data from the various monitoring components 121, 122, 123.

The monitoring components 121, 122, 123 may passively monitor users 101-103. Alternatively or additionally, an active monitoring module 124 may be provided which generates and sends tests patterns calling for predefined responses.

The system 110 includes an analysis module 130 including an abstraction module 134 that provides functional interpretation of the user actions as monitored by the monitoring system 120 and stored in the log 125. The analysis module 130 also includes workflow profiles 131, user profiles 132, and a comparator 133 for comparing the profiles 131, 132 to the user activity and presence monitored by the monitoring system 120 and abstracted by the abstraction module 134.

Figure 2:
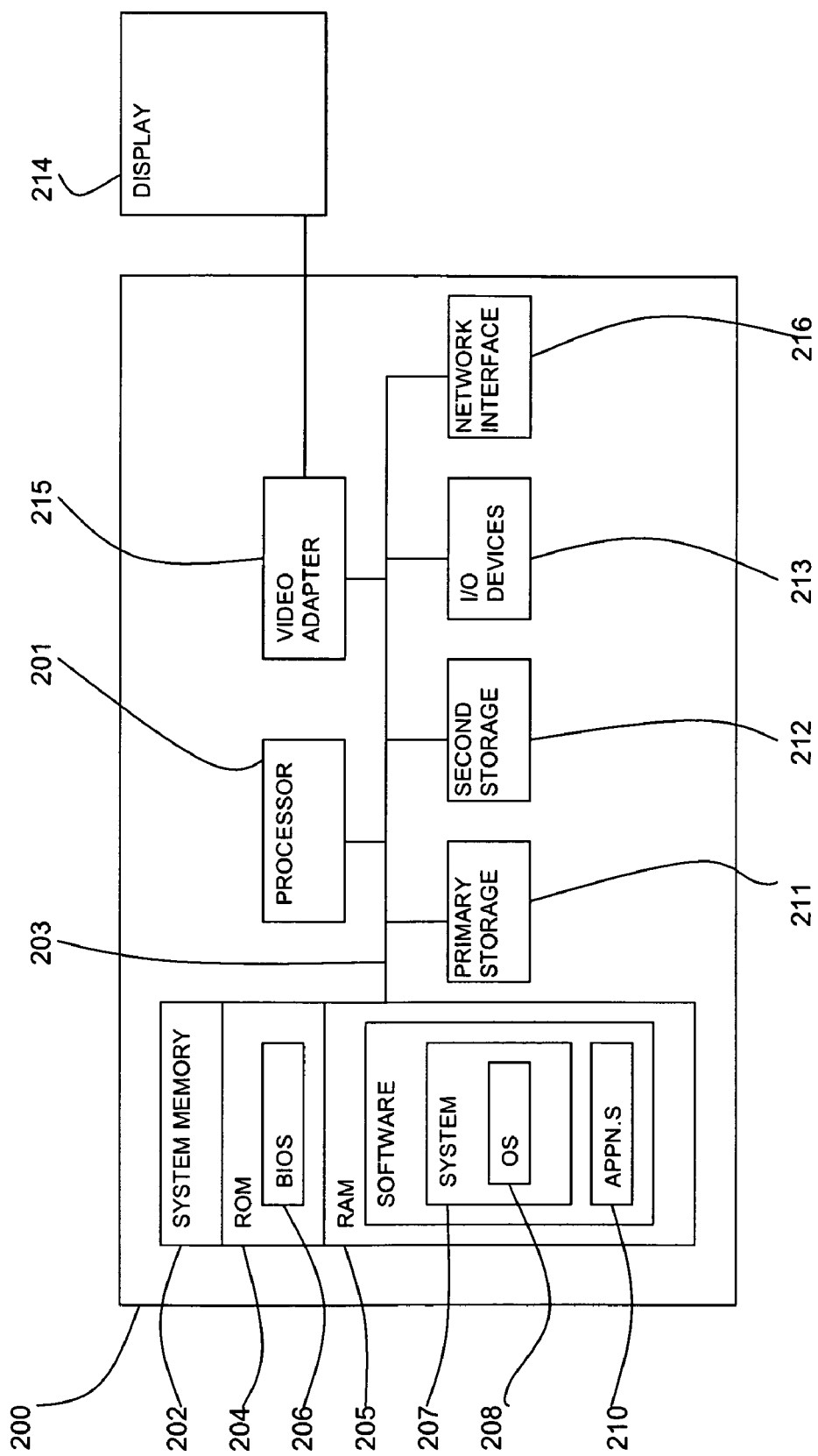
FIG. 2 is a block diagram of a computer system in which the present invention may be implemented.

Referring to FIG. 2, an exemplary system for implementing the system described above and the user workstations includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

The described system monitors user activity using various monitoring aspects including user inputs, screen monitoring, and physical presence monitoring.

The described system uses conventional techniques for interpreting user inputs including keystrokes history, pointer device inputs, etc.

The described system also uses screen understanding. Every screen viewed by the user is analyzed and information content extracted to provide a stored record. A typical record would say that:

User X1, viewed screen X2, containing fields of Customer Name, Customer Address, Number of the past enquiries etc.

Optionally, the system may also store information contained in each field.

The screen was viewed for X3 seconds.

Optionally, start and end time stamps may be kept as well.

Optionally, it may be useful to correlate all the keystrokes pertaining to the given screen.

As a further addition, the described system provides physical presence monitoring. In existing systems, user access is controlled by log-on process verified by the appropriate passwords. However, such systems may miss situations where a given user logged on and left his/her workstation unattended. Similarly, conventional systems would be unable to detect cases where a user was on the phone rather then viewing pertinent information displayed on his/her terminal.

In order to avoid such cases, the described system may include physical monitoring layer. This layer may consist of a video camera mounted on the workstation. Such a camera would provide automatic verification of the employee presence at his/her workstation.

This approach may also be used to augment access control. For example, face verification techniques can be used in addition to passwords. Additionally, control may be increased by shutting a system if a user has left his/her workstation.

Once all the relevant information has been acquired, a high-level analysis module is activated. The analysis module includes employee profiles and/or transaction profiles and a comparator for comparing the profiles to the monitored user activity and presence monitored as abstracted by the abstraction module.

An employee profile for each employee specifies actions and access allowed or required by an employee. For example, specifying that a given employee is authorized to perform transactions:

"1001 Approving payment for adult having orthopaedic surgery";
"1002 Approving payment for paediatric orthopaedic surgery";

A transaction profile for each possible transaction specifies actions required to perform a transaction. For example, specifying that Transaction 1001 calls for:

Viewing customer personal data including name and address for at least 3 seconds but no more than 30 seconds.
If the number of past payment requests during the last 3 years exceeds two then all the past requests must be viewed for at least 5 seconds each.
Hitting approval or reject button.

Specifying that transaction 1002 calls for:

All the actions specified for transaction 1001.
Additional requirements so that if the number of past injuries during the last 2 years exceeds three then notification of social services must be verified by viewing appropriate form for 3 seconds or, if no such document exists, new notification form must be filled in.

Examples of abstractions of user activities that are compared to the work profiles are given below.

Operator wrote a case report—this may be combined with testing for the report compliance with certain predefined patterns, for example, testing whether the report has more than 3 words and more than 10 characters.
Operator verified that his/her report appears at the system—he retrieved an appropriate screen and looked at the comments there.
Operator verified past bills for a given utility customer. Note that this functional task can be done either by viewing, for example, a screen showing past usage or by viewing another screen showing past meter readings for the given customer. This example illustrates the fact that different inputs may provide similar functional abstractions.

Referring to FIG. 3, a schematic diagram 300 is used to illustrate the described method. Monitored user actions 310 include user inputs 311, screen displays 312, and physical presence 313 of a user at a workstation. The monitored user actions 310 are monitored over time, shown by the horizontal axis 301 of the figure.

As an example, at a given moment in time t1 302, the user input 311 selects customer data 311a, the screen display 312 is of a customer data screen viewed for 10 seconds 312a, and the physical presence 313 monitors the user at the workstation 313a.

A next level 320 is the abstraction of the user actions 310 into functional actions. The functional actions 321-323 are grouped into actions. Following the example, a functional action 322 at the time t1 302, is that the user looked at customer data for 10 seconds.

A further level 330 is a work profile, in this example, a transaction profile with actions 331-333 required within the profile. Following the example, an action 332 in the transaction profile is to view customer data for a time between 3 seconds and 30 seconds.

In this example, the monitored user actions 310 as abstracted to functional actions 320 conform to the work profile 330.

The analysis studies all the log information in order to verify that each user performs transactions in his/her profile and that each transaction fits the appropriate transaction profile.

Verification is done on a functional level by abstraction of the monitored activities to a functional interpretation. For example, assume that an operator must verify customer name and address information and insurance policy number. This information may be accessible from five different screens. Hence, there is little point in performing such verification by analyzing all the keystrokes history. Instead, the system would perform this task by analyzing directly screen image content.

Referring to FIG. 4, a flow diagram 400 shows an embodiment of a described method. Monitoring data is obtained 401. The monitored data is abstracted 402 to provide a functional interpretation of activities. The user profile is referred to 403 and it is determined 404 if the monitored activity conforms to the user profile. If not, an alert is generated 405.

If the monitored activity conforms to the user profile, a transaction profile is referred to 406. It is determined 407 if the monitored activity conforms to the transaction profile. If not, an alert is generated 408. If it does conform, the process ends 409.

In all the stages, encryption techniques can be used in order to prevent tampering with data.

Passive monitoring can be used in which the system provides an unobtrusive follow up of all the user actions. Alternatively, an active policy can be adopted with some degree of intervention in the normal workflow. For example, active system may create test patterns with known responses. Comparing user actions to the correct response would allow assessment of the operator decisions. Hence, for active systems, it is possible to verify both the workflow correctness and correctness of the actual operator actions. Naturally, an active system would be configured in such a manner that the number of test patterns would be small (in comparison to the overall work load), while, at the same time, quality evaluation would be statistically valid. Moreover, test patterns would be generated in such a manner that there will be no repetition of tests for any given operator.

An optimal system may include functional workflow verification of 100% of transactions and correctness verification for some random subset of all the transactions. Additionally, eyeball tracking can be used in order to verify that the operator is checking the right fields.

The functional monitoring, as described in the scope of this disclosure ensures adherence to specified user or work flow profiles and procedures. In other words, the system will verify that a user performs a pre-specified sequence of actions (for example, reviewing appropriate information).

This is particularly important in the context of the outsourcing scenario, where company X outsources business transactions to employees of a third party. This provides flexibility instead of structuring a business application so that a workflow process is enforced. For instance, if a workflow definition calls for a review of a certain piece of information, then a business application can be build such that, at a certain point in time, appropriate information screen would be displayed for the appropriate time span. However, in many cases companies would like to ensure workflow adherence without changing existing applications.

In many cases, in order to ensure productivity, rigid work processes should be avoided allowing some degree of employee empowerment. In the above example, a workflow would specify that given piece of information must be reviewed before the approval. However, it would be up to the operator to determine whether review would be at the beginning or at the end of the process. The described system would ensure adherence to the system requirements without affecting work process itself.

One of the main functions and benefits of the described system would be in the context of training. In this context, the system would be used by users themselves for the purpose of self-monitoring. In fact, if desired, the system could be configured such that only the users themselves would have access to the monitoring results. Moreover, the system would streamline testing process reducing overall training costs.

In another application, the system can be actually used in order to enhance employee privacy. Consider, for example, Jane Doe who works for the firm X. Jane has Web access in order to search catalogs of hardware suppliers to her firm. A workflow may call for examination of at least two different suppliers for each procurement request. Assume that Jane is ill and uses her Web access in order to find a medical doctor. This in itself may be a very minor violation of the company policies. However, while using traditional monitoring tools, company X monitors Jane's work by logging her Web screens. In such a manner company X would inadvertently violate the privacy of Jane's medical records. In contrast, the described system would be configured in such a manner that only work related screens would be retained and analyzed. Hence, the described system would help Jane to perform quality work without undue outside intrusion in her personal matters.

A monitoring system may be provided as a service over a network. For example, as a training aid for a user, a remote service may be provided. In another example, a service for an organization for monitoring users such as employees may be provided remotely over a network.

The invention may take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A system for monitoring a workstation, comprising:
a processor;
a monitoring system for monitoring activity on a computer workstation;
an abstraction module that provides functional interpretation of the monitored activity, including a sequence of high level activities performed by a user of the workstation; and
an analysis module for comparing the functional interpretation of the activity to a plurality of requirements specified in a corresponding work profile, which defines requirements which need to be met by the high level activities without defining the order of the activities, so as to verify that the sequence of high level activities was performed in accordance with the requirements;
wherein any of said monitoring system, abstraction module, and analysis module are implemented in either computer hardware or computer software and embodied in a computer readable medium.

2. The system as claimed in claim 1, including an alert generator for generating an alert if the monitored activity does not conform to the work profile.

3. The system as claimed in claim 1, wherein the monitoring system includes an inputs monitor for monitoring inputs by a user into the workstation by an input device.

4. The system as claimed in claim 3, wherein the inputs monitor monitors one or more of the group of: keystrokes, pointer device movement and input, touch screen input, joystick input.

5. The system as claimed in claim 1, wherein the monitoring system includes a screen monitor which extracts content from a screen display viewed by a user.

6. The system as claimed in claim 5, wherein the screen monitor uses optical character recognition (OCR) based content extraction.

7. The system as claimed in claim 1, wherein the monitoring system includes a physical presence monitor to determine if a user is at his workstation.

8. The system as claimed in claim 1, including a log of monitored data for analysis.

9. The system of claim 8, wherein the abstraction module is configured to determine whether activities are work-related, based on their content, and to include in the log only information pertaining to work related activities.

10. The system as claimed in claim 1, including an active monitoring system including a test pattern generator, wherein the test pattern calls for a required response.

11. The system as claimed in claim 1, wherein the system is a training system for a user to monitor and analyse their own activities.

12. The system as claimed in claim 1, wherein the system includes a privacy configuration means to restrict monitoring to work related activities.

13. The system of claim 1, wherein the work profile includes at least one conditional statement, formed of a condition and a corresponding requirement, and the analysis module requires that the requirement be met, only if the corresponding condition is fulfilled.

14. The system of claim 1, wherein the analysis module is configured to compare activity times of specific activities in a functional interpretation from the abstraction module to timing constraints in the corresponding work profile.

15. The system of claim 1, wherein the analysis module is configured to verify that a user viewed information for at least a required time.

16. The system of claim 1, wherein the analysis module is configured to verify that the user viewed information required to be viewed according to work procedures.

17. The system of claim 1, wherein the analysis module is configured with work profiles which allow a plurality of different functional interpretations to meet the requirements of the work profile.

18. The system of claim 1, wherein the monitoring system is configured to perform eyeball tracking.

19. The system of claim 1, wherein the abstraction module is configured to determine for each screen viewed by the user, the fields included in the viewed screen and the time for which the screen was viewed.

20. The system of claim 19, wherein the abstraction module is configured to determine for the fields included in the viewed screen, the information contained in each field.

21. A method for monitoring a workstation, comprising:
monitoring activity on a computer workstation, including inputs by a user of the computer workstation using input devices;
converting the activity to a functional interpretation of the activity, including a sequence of high level activities performed by the user of the workstation; and
comparing the functional interpretation of the activity to a plurality of requirements specified in a work profile, which defines requirements which need to be met by the high level activities without defining the order of the activities;
wherein any of said steps are implemented in either of computer hardware or computer software and embodied in a computer-readable medium.

22. The method as claimed in claim 21, including generating an alert if the monitored activity does not conform to the work profile.

23. The method as claimed in claim 21, wherein monitoring activity includes monitoring a screen display viewed by a user including extracting content from the screen display.

24. The method as claimed in claim 23, wherein extracting content from the screen display uses optical character recognition (OCR) based content extraction.

25. The method as claimed in claim 21, wherein monitoring activity includes monitoring the physical presence of a user at his workstation.

26. The method as claimed in claim 21, including active monitoring including generating a test pattern, wherein the test pattern calls for a required response.

27. The method as claimed in claim 21, wherein the method is used for training a user to monitor and analyse their own activities.

28. The method as claimed in claim 21, including preparing a log of user activity and configuring the monitoring to include in the log only work related activities.

29. A non-transitory computer program product for monitoring a workstation, the computer program product comprising:
a computer readable storage medium;
computer program instructions operative to:
monitor activity on a computer workstation, including inputs by the user using input devices;
convert the activity to a functional interpretation of the activity, including a sequence of high level activities performed by a user of the workstation; and
compare the functional interpretation of the activity to a plurality of requirements specified in a work profile, which defines requirements which need to be met by the high level activities without defining the order of the activities.

30. A method of providing a service to a customer over a network, the service comprising:
monitoring activity on a computer workstation, including inputs by a user of the computer workstation using input devices;
converting the activity to a functional interpretation of the activity, including a sequence of high level activities performed by a user of the workstation; and
comparing the functional interpretation of the activity to a plurality of requirements specified in a work profile, which defines requirements which need to be met by the high level activities without defining the order of the activities;
wherein any of said steps are implemented in either of computer hardware or computer software and embodied in a computer-readable medium.

* * * * *